(12) United States Patent
Johnson et al.

(10) Patent No.: US 6,904,202 B1
(45) Date of Patent: Jun. 7, 2005

(54) WRITING WAVEGUIDES WITH AN ARBITRARY BRAGG WAVELENGTH

(75) Inventors: Alan Johnson, San Jose, CA (US); Anders Grunnet-Jepsen, San Jose, CA (US); Pierre St. Hilaire, Belmont, CA (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 10/210,583

(22) Filed: Jul. 31, 2002

(51) Int. Cl.[7] .............................................. G02B 6/34
(52) U.S. Cl. ...................................... 385/37; 385/31
(58) Field of Search ............................ 385/10, 37, 122, 385/123, 31; 430/290

(56) References Cited

U.S. PATENT DOCUMENTS

| | | | |
|---|---|---|---|
| 4,093,339 A * | 6/1978 | Cross ........................... | 359/34 |
| 5,066,133 A * | 11/1991 | Brienza ........................ | 359/570 |
| 5,367,588 A * | 11/1994 | Hill et al. ..................... | 385/37 |
| 5,912,999 A * | 6/1999 | Brennan et al. ............... | 385/37 |
| 5,945,261 A * | 8/1999 | Rourke ......................... | 430/321 |
| 6,310,996 B1 * | 10/2001 | Byron .......................... | 385/37 |
| 6,384,977 B1 * | 5/2002 | Laming et al. ............... | 359/570 |
| 6,549,705 B1 * | 4/2003 | Laming et al. ............... | 385/37 |
| 6,690,860 B2 * | 2/2004 | Matsumoto et al. .......... | 385/37 |

\* cited by examiner

*Primary Examiner*—John D. Lee
*Assistant Examiner*—Jennifer Doan
(74) *Attorney, Agent, or Firm*—Trop, Pruner & Hu, P.C.

(57) ABSTRACT

A Bragg grating may be written at an arbitrary wavelength without extensive recalibration or reconfiguration of the writing equipment in some embodiments. A pair of writing beams may be used to expose a waveguide. The crossing angles of the writing beams may be adjusted. In one embodiment, circular wedges in each writing beam may be rotated about their axes to alter the crossing angle. In another embodiment, acousto-optic Bragg cells may be utilized to change the writing angle of the writing beams.

29 Claims, 4 Drawing Sheets

WRITING WAVEGUIDES WITH AN ARBITRARY BRAGG WAVELENGTH

BACKGROUND

This invention relates to optical networks and, particularly, to waveguides including Bragg gratings.

An optical add/drop multiplexer is an important component in most optical networks. The multiplexer pulls down the desired channels from a network branch and replaces those channels with different contents. At the same time, the multiplexer lets the other channels pass through without significant insertion loss.

Generally, the optical add/drop multiplexer uses a fiber or waveguide Bragg grating. The fiber Bragg grating drops input light at the Bragg wavelength. The characteristics of a fiber Bragg grating and, particularly, its Bragg wavelength, are fixed. In other words, a particular fiber Bragg grating is written, for example, using an ultraviolet light, to have a predetermined Bragg wavelength. As a result, a given grating may only be able to reject or drop one wavelength.

At different times, however, it may be desirable to write a grating that rejects different wavelengths. Enabling an interferometer manufacturing device to convert to writing a different Bragg wavelength may be complicated and time consuming. Substantial realignment and/or recalibration may be required in some cases.

Thus, there is a need for better ways to write a waveguide with an arbitrary Bragg wavelength.

DETAILED DESCRIPTION

Figure 1:
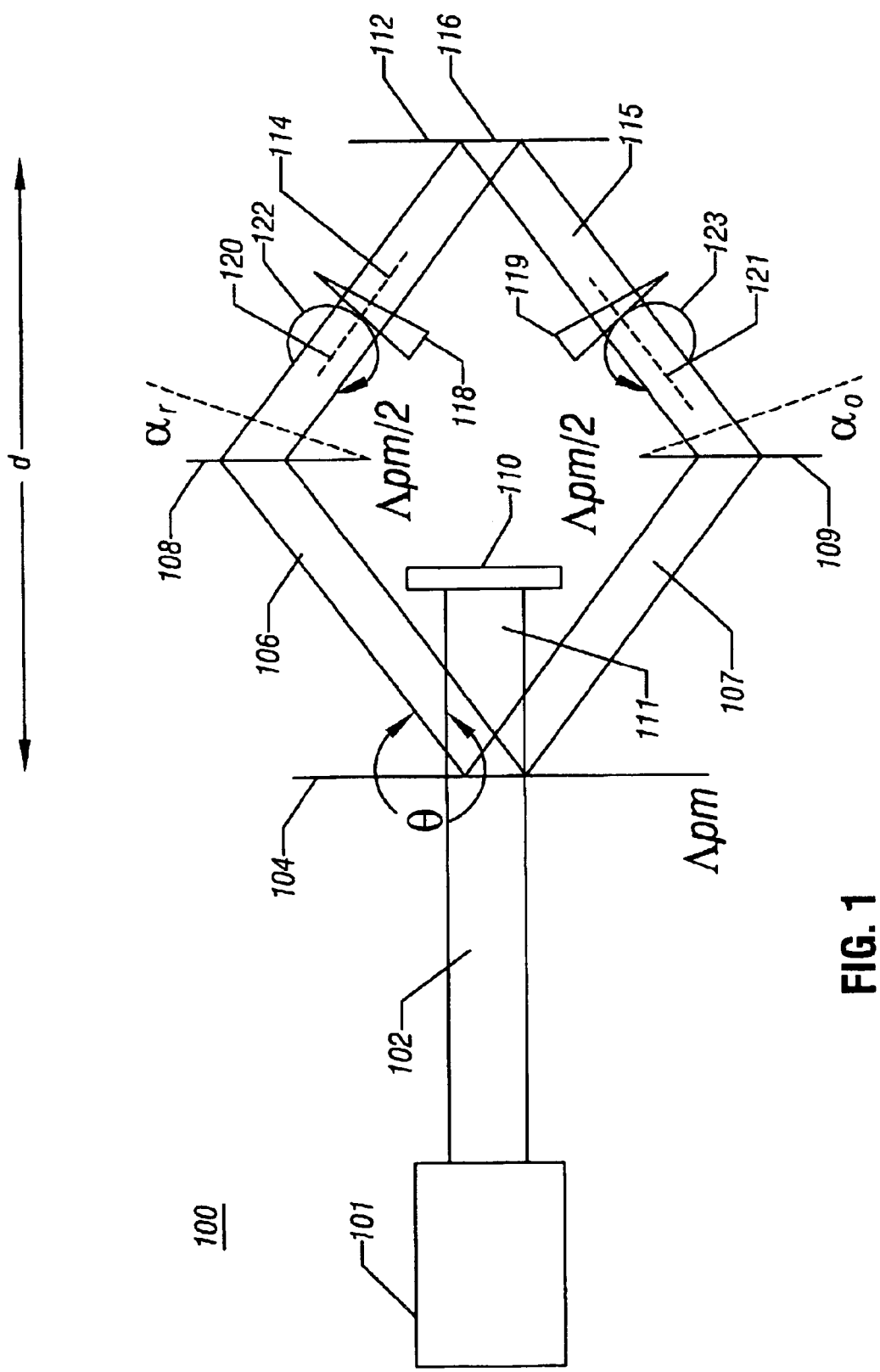
FIG. 1 is a schematic depiction of one embodiment of the present invention.

An interferometric fabrication apparatus 100, shown in FIG. 1, enables waveguide fabrication that, in some embodiments, is tolerant to substantial errors in alignment, laser beam pointing, laser wavelength, and other potential error sources. For example, the apparatus 100 permits control of grating period and grating phase in the manufacture of Bragg gratings in any waveguide including planar and fiber waveguides.

The apparatus 100 includes a laser 101 (or other light source) that produces a laser beam 102 that is incident to a first diffraction grating 104 having a period $\Lambda_{pm}$. Diffraction orders 106, 107 (the +1 and −1 diffraction orders, respectively) are produced and directed to respective gratings 108, 109 that have grating periods of about $\Lambda_{pm}/2$. The gratings 108, 109 may have grating periods S ranging from about 80%–120% of $\Lambda_{pm}/2$ in some embodiments. While the gratings 108, 109 are illustrated as separate components they may be integrated as a single component. An undiffracted component 111 of the beam 102 may be blocked by a baffle 110 in some embodiments.

A diffraction order 114 (a−1 order) produced by the grating 108 and a diffraction order 115 (a+1 order) produced by the grating 109 are directed to movable, light transmissive devices 118 and 119, which in one embodiment may be circular, rotatable wedges or prisms. However, the devices 118, 119 may be any movable device. For example, devices having two non-parallel light transmissive surfaces, such as lenses may be used as the devices 118, 119. In one embodiment, the devices 118 and 119 are arranged so that their bisector is normal to the direction of propagation of light from a grating 108, 109 to a waveguide 112.

The intersecting angle of the two orders 114, 115 (at the interference pattern 116) and, thus, the spatial frequency, of a Bragg grating being written in a waveguide 112 is modified by rotating the devices 118 and 119. In an embodiment, the axis of rotation is nominally along the direction of propagation of the light, although other rotational directions are possible. In some embodiments, the rotations of the two wedges are in opposite directions, as indicated by the arrows 121, 122. Advantageously, movement of the devices 118, 119 moves the writing beams back and forth across the target.

In some embodiments only one of the devices 118, 119 may be used. However, using both devices 118, 119 and moving them by the same amount may be advantageous. For example, using both devices 118, 119 may aid in maintaining the direction of the interference pattern.

This process introduces a small amount of translation in the position of the beam intersection which may be compensated by translation of the waveguide transverse to the scanning direction. This translation may be perpendicular to the plane defined by the intersection of the beams or within the plane of intersection.

Figure 3:
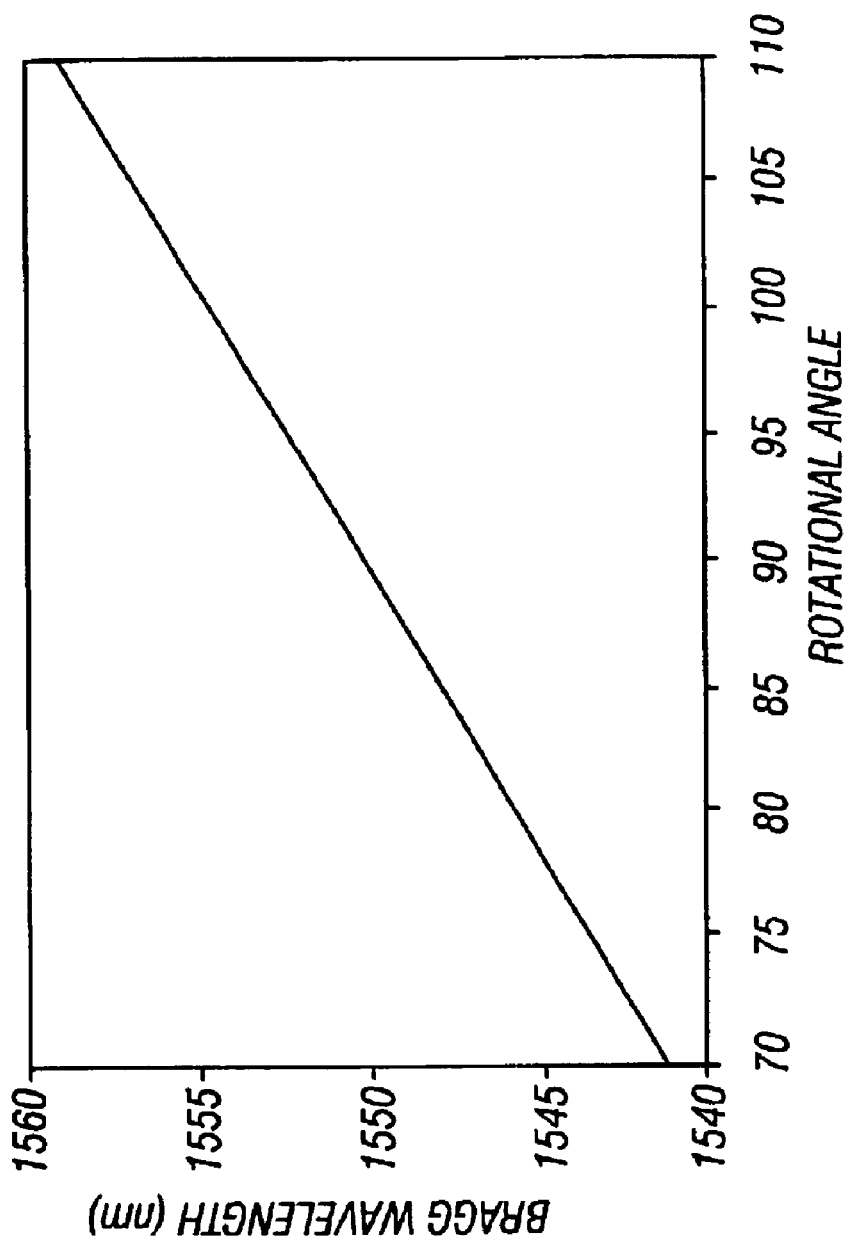
FIG. 3 is a graph of Bragg wavelength in nanometers versus rotational angle in degrees in accordance with one embodiment of the present invention.

The tuning of the Bragg wavelength, for example, as a function of rotational angle for 0.5 degree devices 118, 119, is shown in FIG. 3 in one embodiment.

Figure 4:
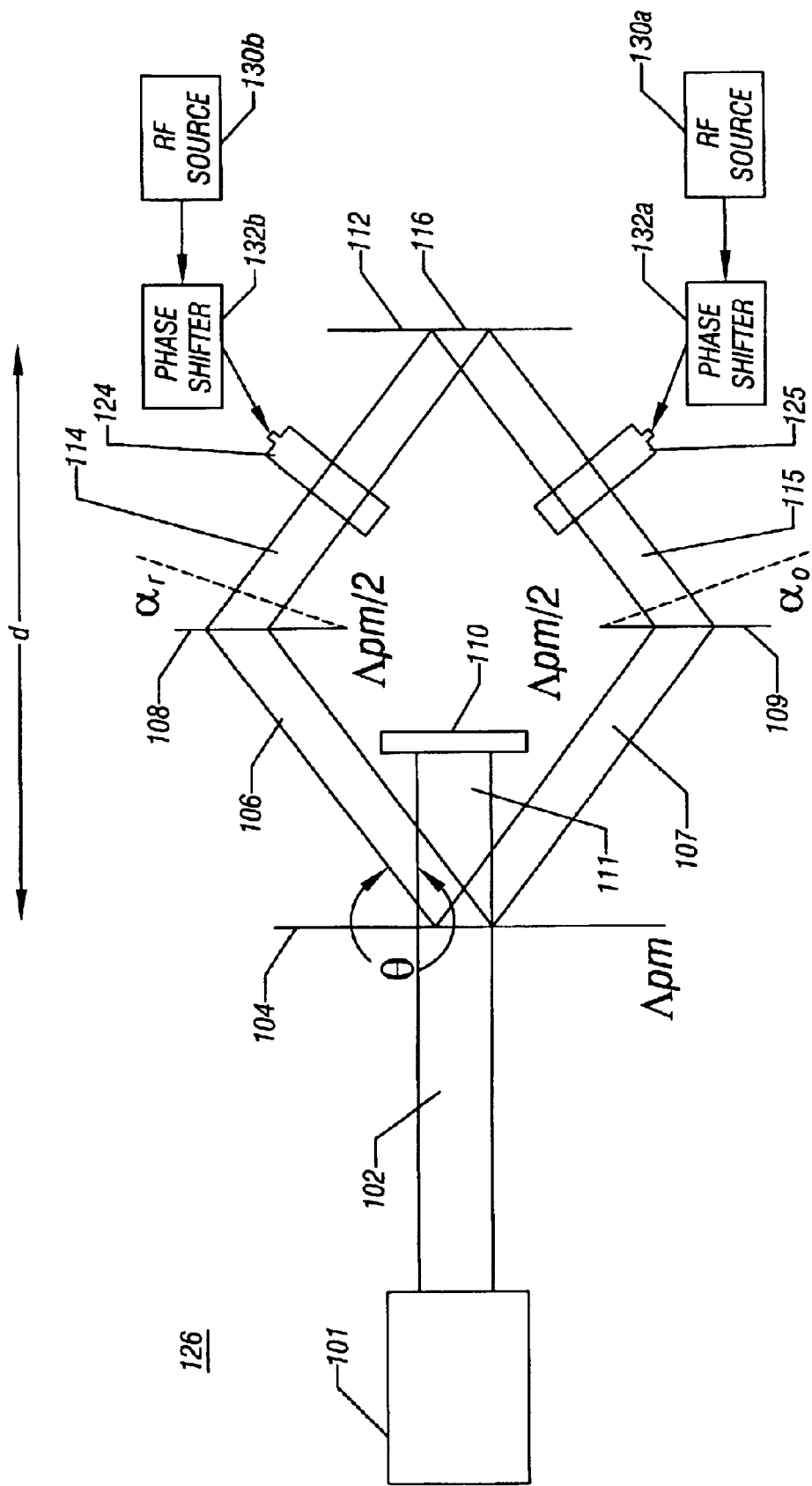
FIG. 4 is a schematic depiction of another embodiment of the present invention.

Referring to FIG. 4, the tuning devices 118, 119 may be replaced by acousto-optic Bragg cells 124, 125 in another embodiment of the present invention. The acoustooptic Bragg cells 124, 125 create a Bragg grating using an acoustic wave. Application of a radio frequency wave to the acousto-optic Bragg cells 124, 125 causes a sound wave to move through a crystal included in each cell 124, 125. The sound wave develops regions of compression and expansion that act like an optical grating. The period of the effective grating is a function of the radio wave frequency so that by charging the frequency of the radio frequency wave, the diffraction of the effective grating may be modified accordingly.

In this case, the intersection angle is modified by changing the frequency of the radio frequency signals 126, 127 used to drive the Bragg cells 124, 125. Exposure by other orders of the Bragg cells 124, 125, such as the undeflected zero order is advantageously avoided.

In addition, diffraction orders such as the zeroth order or higher orders can be readily blocked as needed. In order to deliver an appreciable portion of the power of the laser beam 102 to the interference pattern 116 to reduce Bragg grating exposure times and increase manufacturing throughput, blazed gratings can be used to deliver power to a selected diffraction order or orders.

The apparatus 100 of FIG. 1 can be arranged in several ways for Bragg grating fabrication. According to one embodiment, shown in FIG. 2, a waveguide 152 (in which a grating is to be written) and a primary grating $G_1$ (154) are mounted on a translation stage 156 and secondary gratings $G_2$, $G_3$ (the gratings 158, 159, respectively) are mounted on the stage 156. Beams 171, 172 produced by the gratings 158, 159, respectively, produce an interference pattern in the waveguide 152 after passing through devices 118, 119 mounted on devices 173, 174.

The waveguide 152 is situated to be illuminated with the interference pattern such as the interference pattern 116 of FIG. 1, or other patterned illumination or radiation. In some embodiments the primary grating $G_1$ is additionally mounted on a high precision stage 162 so that the grating $G_1$ can be translated by a selected fraction of a period of the interference pattern with respect to the waveguide 152. Gratings 158 and 159 may be fixed with respect to the translation stage 162 in some embodiments.

A Bragg grating is conveniently written in the waveguide 152 section by section or by continuous scanning. In an embodiment, for a selected section, the phase of the interference pattern is determined by translating the high. precision stage 162 to within a selected fraction of a period of the pattern, and the period of the interference pattern is selected by movement of the devices 118, 119. Alternatively, motion of the wedges or phase shifts in the RF driving of acoustooptic cells could be used to set the phase of the interference pattern. After the phase and period of the interference pattern are determined, exposure of the waveguide 152 to form a Bragg grating begins by, for example, turning on the laser and/or opening a laser shutter. The amplitude of a grating written in a particular section of the waveguide (e.g., the amplitude of a periodic refractive index change produced by exposure to the interference pattern) can be adjusted by dithering GI along an axis 174 (partially washing out fringes of the interference pattern) or through other exposure control means. For embodiments utilizing wedges, control of the amplitude can also be accomplished through appropriate dithering of the wedges. For embodiments utilizing acoutooptic deflectors, appropriate modulation of the phase, amplitude, and/or frequency of the driving RF can be used.

After exposure of a selected waveguide segment is complete, the translation stage 156 is adjusted to position another waveguide segment for exposure to the interference pattern, and the exposure process is repeated. This method generally uses a primary grating $G_1$ that is as long as the total length of the Bragg grating to be produced. In additional embodiments, the waveguide and gratings are stationary while both the laser beam and tuning elements are moved. The laser beam can be moved by, for example, translating the laser or controlling the beam with one or more mirrors, prisms, or other reflective or refractive optical elements.

Figure 2:
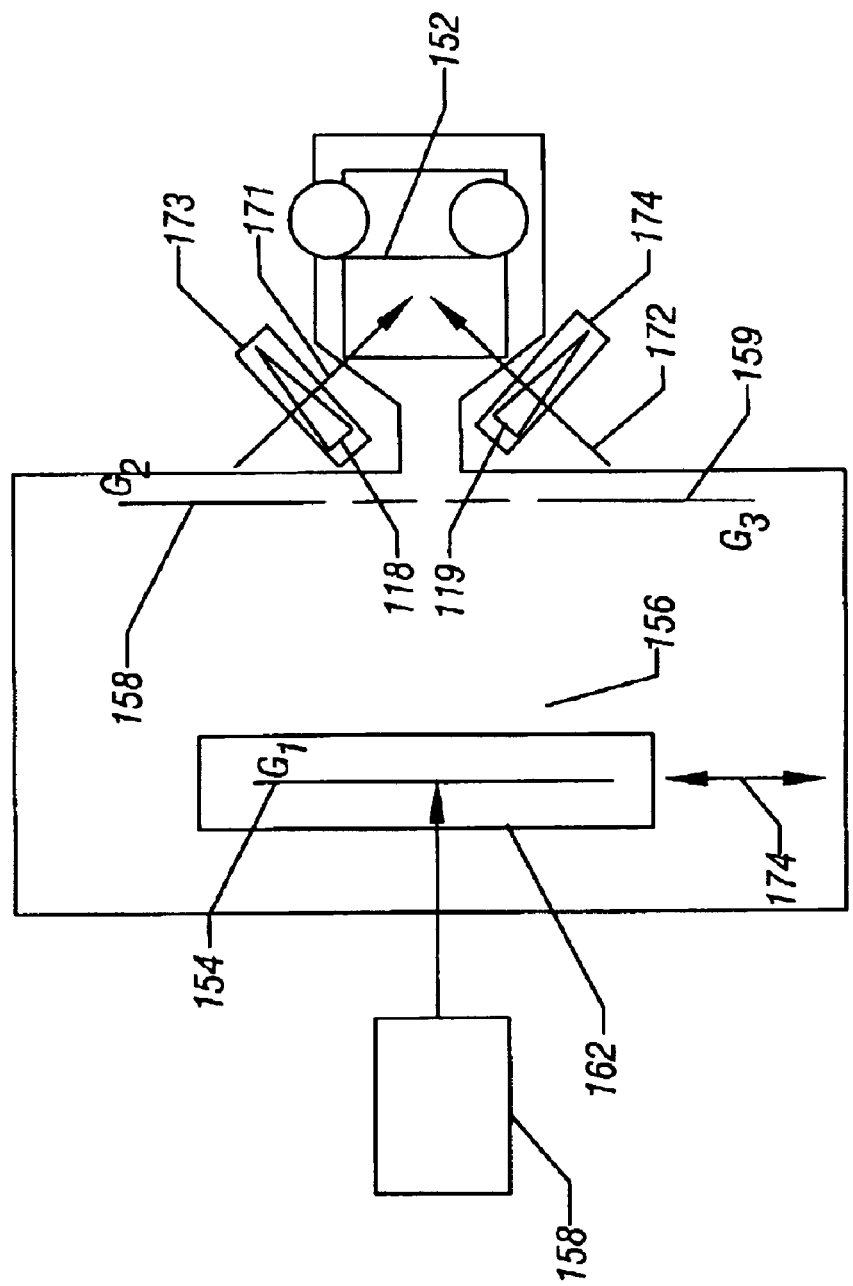
FIG. 2 is a depiction of an apparatus for implementing the embodiment shown in FIG. 1, in accordance with one embodiment of the present invention.

In other methods, diffraction orders other than the first order can be used, and reflection gratings can be used instead of the transmission gratings illustrated in FIGS. 1 and 2. In addition, secondary gratings having periods that are not equal to $\Lambda_{pm}/2$ can be used. A single grating can be used for both secondary gratings. The gratings can be amplitude gratings or phase gratings, or a combination thereof, and, as noted above, can be blazed to provide efficient transfer of power from an incident laser beam (or other optical beam) into a predetermined diffraction order. For fabrication of fiber Bragg gratings (FBGs), radiation at wavelengths of between about 150 nm and about 450 nm is typically selected, but other wavelengths can be used depending on the photosensitivity of the fiber. In addition, exposure times for FBG fabrication can be reduced using one or more spherical or cylindrical lenses or mirrors, or other focusing elements.

Exposure methods using step-wise exposure of waveguides are described above. In additional embodiments, a recording schedule can include one or more exposures of at least some portions of the waveguide. For example, one section of the waveguide can receive multiple exposures if the writing beam has a width greater than an incremental translation distance. Another embodiment includes exposing a waveguide to a writing beam having a width ω and translating the writing beam continuously across the waveguide. The translation can be at a substantially constant rate, or can vary. With such a recording schedule, the total exposure can be represented as a convolution of the beam width ω with the translation profile. By recording the position of exposure of the waveguide, a predetermined amount of dithering, intensity, or beam angle detuning can be applied during exposure. In this way, it is possible to programmably apply an arbitrary index modulation profile to the waveguide.

Insertion of tuning elements (cells 124, 125) into the resulting interferometer may be carried out to ensure that additional phase error is not introduced upon scanning the laser beam with respect to the gratings 108, 109 and the waveguide 112. In particular, if the tuning elements are small and fixed with respect to the laser beam 101, scanning of the interferometric apparatus 100 results in a spatially dependent phase shift in the resulting waveguide 112 grating.

The magnitude of the phase shift is proportional to the detuning of the interferometer from its natural spatial wavelength. The phase shift may be compensated by the application of an appropriate spatially dependent phase correction term, either through the motion of a grating 104, 108, 109, or through the application of a phase shift to the radio frequency signal 126, 127 used to drive the Bragg cells 124, 125. The phase shift may be developed from any variable radio frequency wave received from the radio frequency source 130 by controllably applying a phase shift in a shifter 132.

Interferometric fabrication apparatus such as the apparatus 100 of FIG. 1 permits fabrication of Bragg gratings having selectable refractive index modulations by selective application of an interference pattern to a waveguide. Such apparatus provide interference patterns that are readily accessible so that waveguides to be exposed can be situated in the interference patterns.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   forming a pair of grating writing beams;
   changing the crossing angle of the writing beams using a diffraction grating; and
   exposing a waveguide to said writing beams.

2. The method of claim 1 wherein forming a pair of grating writing beams includes forming a first writing beam and splitting said first writing beams into a pair of grating writing beams.

3. The method of claim 1 including using a first diffraction grating to split said first beam into said pair of grating writing beams.

4. The method of claim 3 including using a second pair of diffraction gratings to direct said pair of writing beams toward substantially the same location on a waveguide.

5. The method of claim 1 wherein changing the crossing angle includes moving, in a writing beam, a device having two non-parallel light transmissive surfaces.

6. The method of claim 1 including forming a pair of grating writing beams by diffracting the light through a first grating, diffracting each of said pair of grating writing beams by a second diffraction grating to direct said pair of grating writing beams towards substantially the same location on a waveguide and changing the crossing angle of the writing beams by rotating a prism between said second diffraction grating and said waveguide.

7. The method of claim 1 including forming a pair of grating writing beams from a first writing beam by causing said first writing beam to be diffracted by a first diffraction grating, diffracting each of said pair of grating writing beams by a pair of second diffraction gratings and altering the crossing angle of the writing beams by causing the input radio frequency energy to an acousto-optic Bragg cell to be altered.

8. An apparatus comprising:
 a first diffraction grating to split a light beam into two grating writing beams;
 a pair of second diffraction gratings in the path of each of said pair of grating writing beams to diffract each of said grating writing beams at a crossing angle to overlap on a waveguide; and
 a device to change the crossing angle of the writing beams.

9. The apparatus of claim 8 wherein said device is a rotatable wedge.

10. The apparatus of claim 9 wherein said rotatable wedge is positioned between said waveguide and one of said second diffraction gratings.

11. The apparatus of claim 10 including a pair of rotatable wedges, each of said wedges positioned in the path of one of said writing beams.

12. The apparatus of claim 9 wherein said wedge is rotatable about an axis aligned with one of said writing beams.

13. The apparatus of claim 8 wherein said device includes an acousto-optic Bragg cell.

14. The apparatus of claim 13 wherein said acousto-optic Bragg cell is positioned between said waveguide and said second diffraction grating.

15. The apparatus of claim 14 including a pair of acousto-optic Bragg cells each in the path of a grating writing beam.

16. The apparatus of claim 8 including a laser to form said light beam.

17. The apparatus of claim 8 wherein said apparatus is achromatic.

18. The apparatus of claim 8 wherein said device is light transmissive and includes two non-parallel light transmissive surfaces.

19. The apparatus of claim 18 including a mechanism to move said device.

20. The apparatus of claim 19 wherein said mechanism rotates said device.

21. A method comprising:
 forming a pair of grating writing beams; and
 passing each of said grating writing beams through a prism to change the crossing angle of said writing beams.

22. The method of claim 21 including rotating said prisms along the directions of propagation of each of said writing beams.

23. A method comprising:
 forming a pair of grating writing beams; and
 changing the crossing angle of the writing beams using an acousto-optic Bragg cell.

24. The method of claim 23 including changing the crossing angle by changing the input frequency to said acousto-optic Bragg cell.

25. A method comprising:
 forming a pair of grating writing beams;
 changing the crossing angle of the writing beams by moving, in each writing beam, a device having two non-parallel light transmissive surfaces.

26. The method of claim 25 including changing the crossing angle by rotating at least one of said devices.

27. The method of claim 25 including rotating both of said devices.

28. The method of claim 25 wherein changing the crossing angle of the writing beams includes rotating a prism within at least one of said writing beams to change the crossing angle.

29. The method of claim 28 including rotating a pair of prisms, one in each of said writing beams, to change the crossing angle.

* * * * *